Nov. 22, 1960       D. H. NEWHALL       2,961,278
HIGH PRESSURE PISTON SEAL
Filed Jan. 2, 1959

Inventor
Donald H. Newhall
by Maxwell Fish
Atty.

2,961,278
Patented Nov. 22, 1960

2,961,278
HIGH PRESSURE PISTON SEAL

Donald H. Newhall, Walpole, Mass., assignor to Harwood Engineering Company, Walpole, Mass., a corporation of Massachusetts Filed Jan. 2, 1959, Ser. No. 784,771

3 Claims. (Cl. 309—4)

The object of the invention is to provide a novel and improved high pressure piston packing.

The improved high pressure packing of the invention is herein disclosed as embodied in a piston head which comprises a main piston body and a floating piston body, the two piston bodies having adjacent faces formed respectively with an axially extending bore and a mating cylindrical projection slidably engaging within the bore A high pressure packing is provided between said adjacent faces of the two piston bodies, which may preferably take the form of a series of leather packing elements reinforced at the edges of said faces abutting the cylinder walls and at the edge of said face abutting the periphery of the cylindrical projection by means of brass reinforcing rings of generally triangular shape which are fitted to correspondingly bevelled edge surfaces of said adjacent piston faces. With this construction the external face of the floating piston body is of greater area than said adjacent face of the main piston body against which said packing is supported whereby the packing is subjected to a mechanical sealing pressure which is always in excess of the pressure exerted against said external face.

In accordance with the invention a mechanical connection is provided between the floating piston body and associated parts of the piston including the main piston body so that the floating piston body is pre-stressed toward the main piston body to maintain the packing under an initial mechanical loading pressure at all times irrespective of variations in the pressure exerted against the outer end face of the piston.

The several features of the invention will be readily understood from the following description taken in connection with the accompanying drawing in which.

Figure 1:
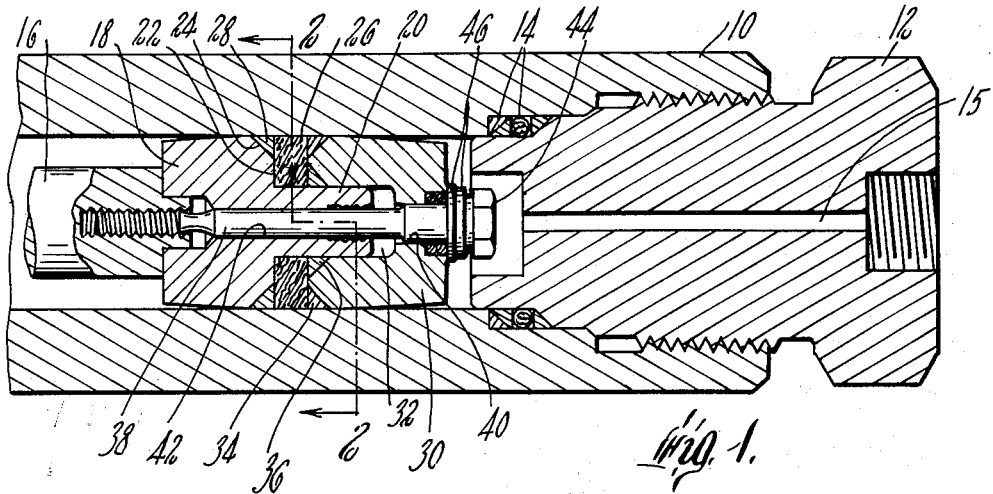
Fig. 1 is a somewhat fragmentary sectional view of an intensifier comprising a cylinder, a piston rod, and a two-part piston head mounted within the cylinder.

One of the most serious problems encountered in the development of pumps or intensifiers having reciprocating pistons capable of producing very high pressures is to provide a seal between the moving piston and cylinder wall which will effectively contain the high pressures generated and which will not at the same time interfere with the movement of or freeze the piston. A suitable packing for a piston of this type may consist of a layer leather type packing, which is in turn supported by ring guards which are preferably triangular in cross section for engagement with correspondingly cammed or bevelled edges of the piston and which expand and contract with variations of pressure to maintain a lubricant film clearance which is reduced or enlarged roughly in proportion as the compressive pressure against the face of the piston is increased or reduced.

For the most efficient operation of a packing of the type described, it has been found desirable to maintain a pressure against the packing which is always in excess of the pressure to be contained. The two-part piston head which forms the subject matter of the present invention provides an effective means for applying against the packing an additional increment of pressure which substantially increases the efficiency of the packing and associated ring support to prevent leakage of fluid past the packing. The floating piston body may be supported with relation to the main piston body to move freely toward and away therefrom so that the pressure exerted by the movable piston body will be exactly proportional to the contained pressure within the cylinder acting against the piston face. In this form of the device it has been found necessary to maintain a substantial minimum back pressure in the cylinder during each return decompression stroke of the piston, first in order to prevent the movable piston body packing from separating from the main piston body, and in order to provide an initial seal at the beginning of the compression stroke of the piston. Such a construction, however, is limited in its use to apparatus having provision for supplying a substantial back pressure into the cylinder during said decompression stroke of the piston. In the preferred embodiment of the invention shown the movable piston body is mechanically connected with main piston body by means of a bolt which is tightened to pre-stress the movable piston body against the main piston body and interposed packing under a minimum pressure. Such minimum pressure is thus maintained at all times during the decompression as well as the compression stroke of the piston thus permitting a wider latitude in the operation of the cylinder unit, as for example, under conditions in which a means for supplying back pressure may not be available, and in which it may be desirable to employ the decompression stroke of the piston to draw a new supply of fluid into the cylinder. In the preferred embodiment of the invention shown, a minimum hydrostatic pressure is exerted against the packing and support rings in both directions at all times, which is sufficient to provide an initial seal of the packing against leakage of fluid from the packing in either direction and to prevent the escape of fluid into the packing area which would result in an excessive build-up of the back pressure within the packing area during successive compression and decompression strokes of the piston with a consequent malfunctioning of the device.

Figure 2:
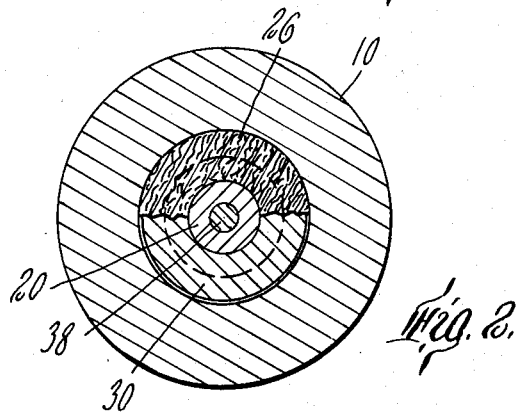
Fig. 2 is a sectional view taken on a line 2—2 of Fig. 1.

Referring to the drawings, Figs. 1 and 2, the invention is shown in a preferred form as embodied in an intensifier comprising a cylinder 10 which is closed at one end by a header 12 screw threaded into the cylinder 10. A seal is provided between the cylinder 10 and header 12 by means of sealing rings 14. Fluid under pressure may be drawn into and expelled from the cylinder through a small passageway 15 in the form of an axial bore extending through the header 12.

The piston unit shown comprises a piston rod 16 to which is attached a main piston body 18 having an axially disposed cylindrical projection 20, and a compression face 22 which is formed with a bevelled outer edge 24.

A ring type packing 26 is provided which is built up of a series of layers of suitable material such as leather, and is supported on the face 22 surrounding the cylindrical projection 20 and on a sealing ring 28 fitted to bevelled the outer edge 24 of the piston body 18. The sealing ring has a triangular shaped cross section and is preferably made of brass in order to ensure a rapid rate of expansion and contraction with variations in pressure as compared with the steel wall of the cylinder. It will be understood that any suitable material, of which brass is only an example, having a relatively high coefficient of expansion and contraction as compared with the cylinder walls, may be used in the manufacture of said rings.

The piston unit includes also a floating piston body 30 which overlies the main piston body 18 and is formed with an axially extending bore 32 to receive the cylindrical projection 20 of the main piston body 18. The cylindrical end surface of the floating piston body 30 which bears against the packing 26 has both the inner and outer edges thereof bevelled to receive sealing rings 34, 36 by means of which the packing 26 is sealed in and protected against the force of any very heavy pressures which may be set up in the reverse direction as the piston moves from the position shown to the left.

In accordance with the invention the movable piston body 30 is secured to the main piston body 18 and piston rod 16 by means of a bolt 38 which is slidably mounted in a small diameter extension 40 of the bore 32, passes through a bore 42 in the main piston body 18, and is screw threaded into the adjacent end of the piston rod 16. The bolt 38 has an enlarged octagonal head 44, and acts through two intervening washers 46 which bear against the outer end face of the movable piston body 30. The bolt 38 is tightened up to a point at which the movable piston body 30 is forced against the packing 26 with a substantial pressure causing the packing to be pre-loaded under a minimum compression which will at all times ensure a sufficient expansion of the sealing rings 28, 34 and 36 to avoid possible damage to the packing 26 which might well result from the sudden building up of a compressive pressure against the advancing face of the piston unit.

In the embodiment shown in Fig. 1 the sealing ring 28 acts to prevent the escape of fluid under pressure past the piston unit to the left, sealing ring 34 similarly prevents the escape of fluid under pressure from the packing area past the floating piston body 30 into the right hand end of the cylinder 10, and the sealing ring 36 prevents any injurious build-up of fluid back-pressure within the cylindrical bore 32 which would prevent the floating piston body from responding to an increase in pressure in the cylinder to correspondingly increase the pressure applied by the movable piston body 30 against the packing 26.

Figure 3:
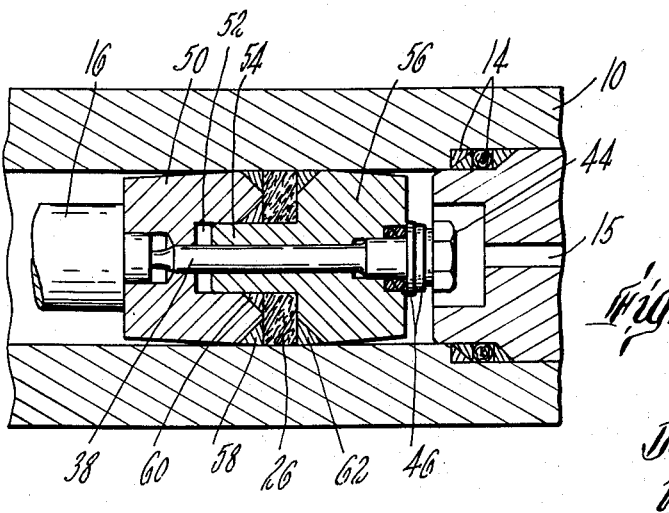
Fig. 3 is a view similar to Fig. 1 illustrating an alternative form of applicant's improved two-part piston head.

Fig. 3 of the drawings illustrates another embodiment of the invention in which the main piston body 50 is formed with a central bore 52 into which is received an axially disposed cylindrical projection 54 of the movable piston body 56. The annular compression surface of the main piston body 50 is bevelled at its inner and outer edges to receive the sealing rings 58 and 60 and the outer edge of the adjacent face of the floating piston body 56 is similarly bevelled to receive a sealing ring 62 for the support of the interposed packing 26. The floating piston body 56 is held in position with relation to the main piston body 50 and is forced against the packing 26 under a pre-loading pressure by means of a bolt 38 which passes through an axial bore in the movable piston body 56, through an extension of the bore 52 of reduced diameter in the main piston body 50 and is screw threaded into the adjacent end of the piston rod 16.

The invention having been described what is claimed is:

1. In combination with a cylinder, a two-part piston comprising with a piston rod, a main piston body connected with said piston rod, and a floating piston body, the two piston bodies having adjacent faces, one of said faces being formed with an axially extending bore and the other of said faces being formed with a cylindrical projection having a sliding fit with the bore, a high pressure packing provided between said adjacent faces of the two piston bodies surrounding said cylindrical projection, packing supporting rings of generally triangular shape and arranged to expand and contract with variations in pressures disposed at the edges of said adjacent piston body faces abutting the cylinder walls and at the edge of said face abutting the periphery of said cylindrical projection, said floating piston body having an external face of greater area than said adjacent face of the main piston body against which said packing is supported whereby the packing is subjected to a mechanical sealing pressure which is always in excess of the pressure exerted against said external face, and a tie member connected axially between said two piston bodies, said tie member providing an adjustable tie connection between said piston bodies, adjustable to stress the floating piston body toward said main body member to maintain a predetermined mechanical loading pressure against said packing, and arranged to permit a further relative packing compressive movement of the floating piston body toward said main piston body in response to an increase in pressure in said cylinder.

2. In combination with a cylinder, a two-part piston comprising with a piston rod, a main piston body connected with said piston rod, and a floating piston body, the two piston bodies having adjacent faces, one of said faces being formed with an axially extending bore and the other of said faces being formed with a cylindrical projection having a sliding fit with the bore, a high pressure packing provided between said adjacent faces of the two piston bodies surrounding said cylindrical projection, reinforcing rings of generally triangular shape and arranged to expand and contract with variations in pressure disposed at the edges of said adjacent piston body faces abutting the cylinder walls and at the edge of said face abutting the periphery of said cylindrical projection, said floating piston body having an external face of greater area than said adjacent face of the main piston body against which said packing is supported whereby the packing is subjected to a mechanical sealing pressure which is always in excess of the pressure exerted against said external face, and a tie member extending axially with relation to and providing a tie connection between said main piston body and said floating piston body, said tie member having a screw threaded connection with said main piston body member and a head portion engaging said floating piston body, whereby said tie member is adjustable to stress the floating piston body member against said main piston body to maintain a predetermined mechanical loading pressure of the floating piston body against said packing, while permitting a further relative packing compressive movement of the floating piston body toward said main piston body in response to an increase in pressure in said cylinder.

3. In combination with a cylinder, a two-part piston comprising with a piston rod, a main piston body connected with said piston rod, and a floating piston body, the two piston bodies having adjacent faces, one of said faces being formed with an axially extending bore and the other of said faces being formed with a cylindrical projection having a sliding fit with the bore, a high pressure packing provided between said adjacent faces of the two piston bodies comprising a suitable pliable packing material, and continuous reinforcing rings of generally triangular shape having a high coefficient of expansion and contraction as compared with the cylinder, said rings being disposed at the edges of said adjacent piston body faces abutting the cylinder walls and at the edge of said face abutting the periphery of said cylindrical projection, said floating piston body having an external face of greater area than said adjacent face of the main piston body against which said packing is supported whereby the packing is subjected to a mechanical sealing pressure which is always in excess of the pressure exerted against said external face, and a tie member passing axially through said piston bodies, the floating piston body being slidable thereon, said tie member having a head portion engaging said floating piston body member and a screw threaded connection with said main piston body member, said tie member being stressed to maintain a mechanical loading pressure of the floating piston body member against said packing.

References Cited in the file of this patent

UNITED STATES PATENTS

| | | |
|---|---|---|
| 1,974,362 | Marsh | Sept. 18, 1934 |
| 2,663,600 | Newhall | Dec. 22, 1953 |

FOREIGN PATENTS

| | | |
|---|---|---|
| 925,559 | Germany | Mar. 24, 1955 |